Dec. 11, 1945.     O. E. SZEKELY     2,390,626
AIRCRAFT SUPERCHARGER DRIVE
Filed Nov. 18, 1942     5 Sheets-Sheet 1
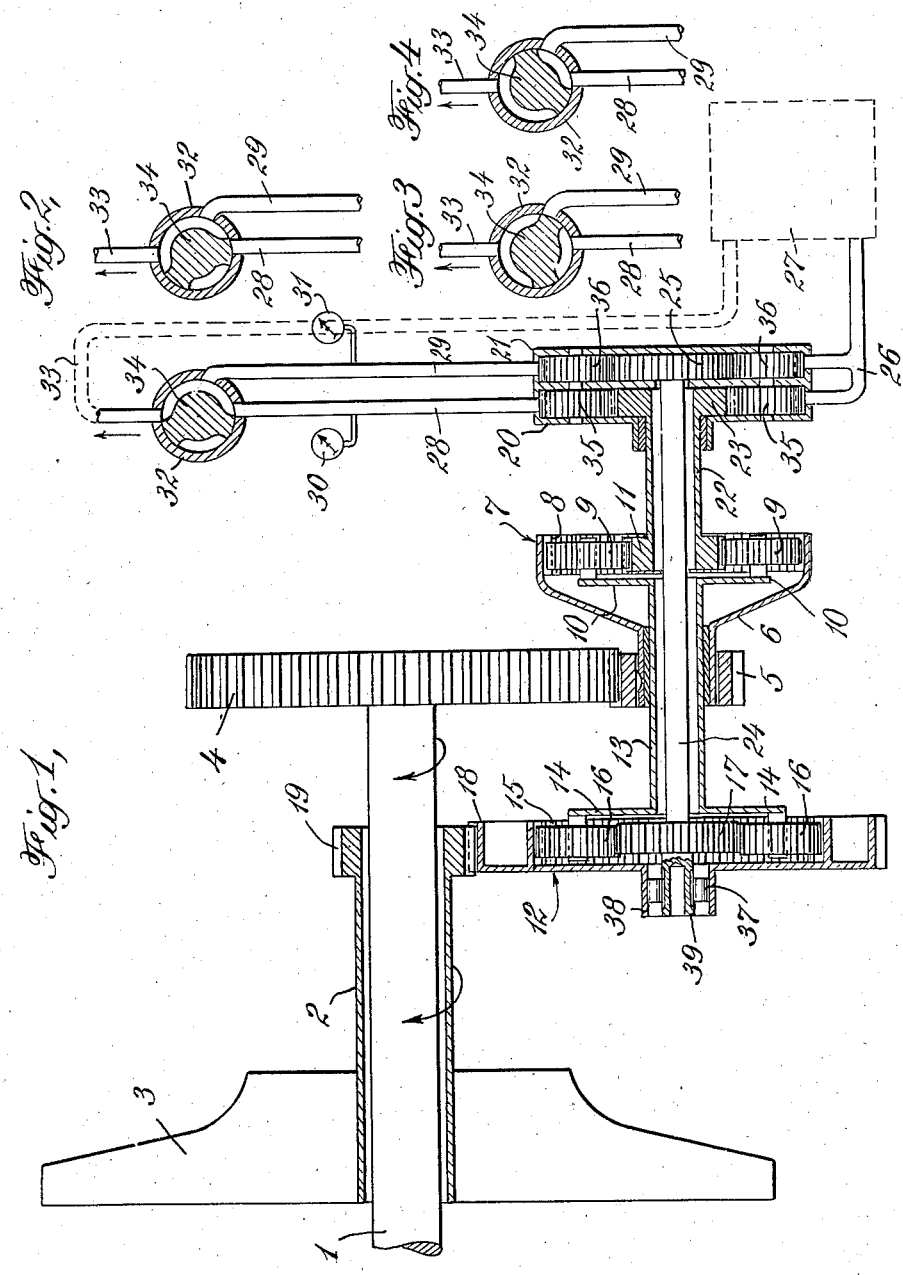
INVENTOR
*OTTO E. SZEKELY*
BY
Pennie, Davis, Marvin & Edmonds
HIS ATTORNEYS Dec. 11, 1945. O. E. SZEKELY 2,390,626
AIRCRAFT SUPERCHARGER DRIVE
Filed Nov. 18, 1942 5 Sheets-Sheet 2

Fig. 5.

INVENTOR
*OTTO E. SZEKELY*
BY
Pennie, Davis, Marvin & Edmonds
HIS ATTORNEYS

INVENTOR
OTTO E. SZEKELY
HIS ATTORNEYS

Dec. 11, 1945. O. E. SZEKELY 2,390,626
AIRCRAFT SUPERCHARGER DRIVE
Filed Nov. 18, 1942 5 Sheets-Sheet 5
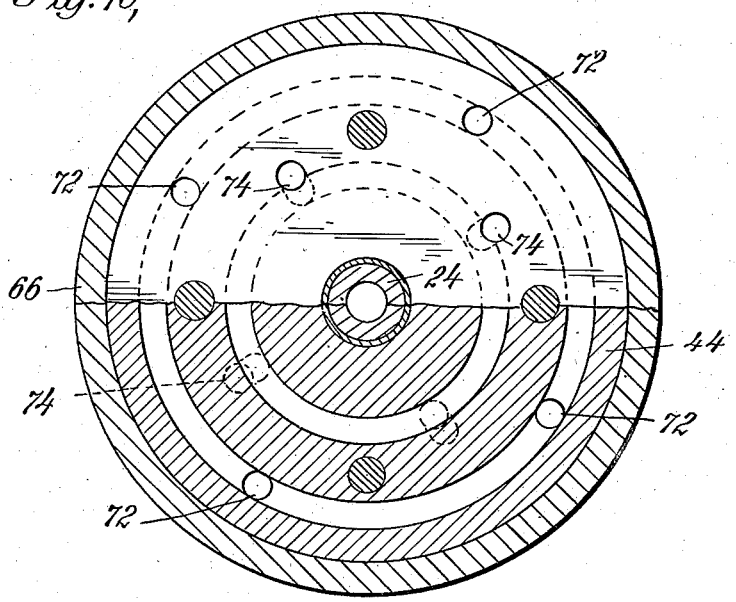
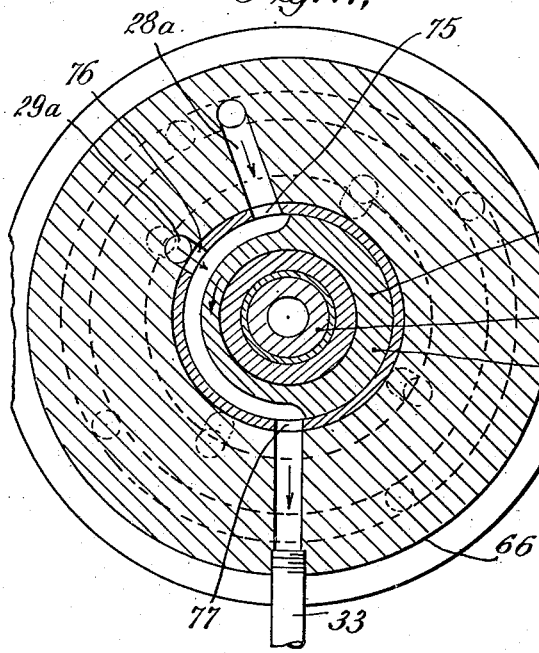
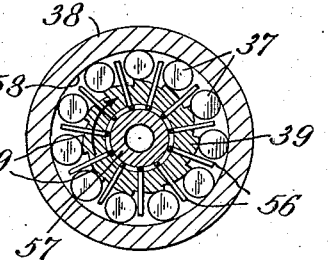
INVENTOR
OTTO E. SZEKELY Patented Dec. 11, 1945

2,390,626

UNITED STATES PATENT OFFICE 2,390,626

AIRCRAFT SUPERCHARGER DRIVE

Otto E. Szekely, Philadelphia, Pa., assignor to The Szekely Company, Inc., Philadelphia, Pa., a corporation of New York Application November 18, 1942, Serial No. 465,980

17 Claims. (Cl. 74—293)

This invention relates to the supplying of combustion air to internal combustion engines that operate under variable air conditions, such, for example, as aircraft engines which are required to operate both at sea level and at high altitudes, so that the air available to supply oxygen for combustion varies greatly in density, that is, in its weight per cubic foot. As is well understood, a supercharger is used to furnish the aircraft engine with air at sea level or other desired pressure, irrespective of the altitude of the airplane, and comprises essentially an air compressor, or pump, which delivers air to the engine cylinders either through a carburetor or directly, as in a compression ignition engine.

More particularly, the invention relates to the provision of a power transmission apparatus, or drive, for connecting the supercharger with the engine shaft in such a way as automatically to increase the speed and consequently the output of the supercharger so that air of substantially uniform density may be supplied to the engine cylinders irrespective of the altitude at which the engine may be operating.

Supercharger drives at present are of two principal types. One is a change-speed gear somewhat similar to those used in motor vehicles but operating to step-up the speed instead of to reduce it. These gears have a number of objections, the principal one, so far as commercial flying is concerned, being the necessity of including a clutch which must be released in order to make a manual shift so as to change the gear ratio. Due to space and weight considerations, it has been impossible to construct these clutches so they will hold firmly. Consequently, rapid wear takes place and it is at present customary to replace the clutch friction plates on substantially each round trip between New York and Chicago, for example. From the military point of view, such manual shifting is impracticable because the pilot's attention must be given to other matters.

The second type of supercharger drive is the turbo drive in which the charging air pump is driven by a turbine whose motive fluid is the exhaust from the internal combustion engine. This form of drive provides a degree of automatic regulation of the charging air but it also has many disadvantages. Its greatest disadvantage from the military standpoint is the slowness of response of the engine to change in throttle opening. Other disadvantages are bulkiness, excessive weight, impairment of operation of the engine and the necessity of providing intricate automatic control mechanism to cause the proper diversion of the engine exhaust gases through the turbine.

The sluggishness of response of engines having turbo driven superchargers to change in throttle opening impairs the maneuverability of the plane and may place it at serious disadvantage. The reason for sluggishness in the development of power by the engine is that increase in the speed of the supercharger is dependent upon increase in the pressure and velocity of the exhaust gases, or, in other words, the increase in the supercharger speed and the increase in the engine power are dependent upon each other. A large increase in engine power is dependent upon increase in speed of the supercharger but the turbine which drives the supercharger cannot increase its speed until the engine power has increased. Hence even with skillful manipulation of the throttle the engine power can be built up only gradually. It is one of the most important objects of the present invention to overcome this difficulty and to enable the engine to respond promptly to the opening of its throttle, and to eliminate the necessity of opening the throttle gradually.

The aim of the present invention is to solve in a different and better way the same problem toward the solution of which the turbo drive was directed. Stating it differently, the aim of the invention is to overcome the difficulties of both the change-gear drive and the turbine drive, while at the same time providing a uniform quantity of air by weight, for each cylinder charge for a given engine speed, regardless of whether the engine is operating at sea level or at high altitudes of, say 30,000 to 40,000 feet.

Thus an object of the invention is to eliminate the serious disadvantage of the change-gear drive from the military point of view, namely, that with such drive, when the pilot reaches the altitude at which it becomes necessary to increase the speed of the charging air pump in order to climb higher, it is necessary for him to level off, or even slightly lose altitude in order momentarily to remove the torque load from the gears so as to be able to shift them manually. Should a plane be under attack at that instant it obviously would be at a serious disadvantage.

Another object of the invention is to provide an improved supercharger drive of the type having an infinite number of speed ratios between its minimum and maximum ratios.

A further object of the invention is to provide a supercharger drive having a plurality of substantially fixed speed ratios but whose speed ratio can be varied in infinitely small increments between such fixed ratios.

Another object of the invention is to provide a driving apparatus between engine and charging air pump which is extremely compact, and which, although providing automatic compensation for change in altitude instead of requiring manual operation, yet occupies no greater space than a manually operated change-gear drive of the same horse-power capacity.

In the change-gear type of drive it is customary to include in the gear train a flexible gear in order to prevent the transmission to the supercharger of vibrations set up in the crankshaft of the engine, this being particularly important when engines of the V-type are used on account of the "wind-up" or torsional twist which takes place in the crankshafts of such engines. Since the form of supercharger commonly employed is a rotary compressor whose impeller operates at high speed (15,000-25,000 R. P. M.) the importance of preventing the transmission to it of engine crank shaft torsional vibration will be understood, and a further object of the invention is to provide a drive for such a supercharger which, because of its inherent characteristics, prevents, without the employment of flexible gearing, the transmission of such vibration.

The invention will be understood from a consideration of the accompanying drawings which, by way of example, illustrate one embodiment thereof, it being understood that these drawings are for the purpose of illustration only and that the scope of the invention is set forth in the accompanying claims.

In these drawings:

Fig. 1 is a diagrammatic illustration of a supercharger drive arranged in accordance with the invention;

Figs. 2, 3 and 4 are diagrammatic sectional views similar to a portion of Fig. 1;

Fig. 5 is a view in central longitudinal section showing the construction of the supercharger drive applied to the rear end of an aircraft engine;

Figures 6, 7:
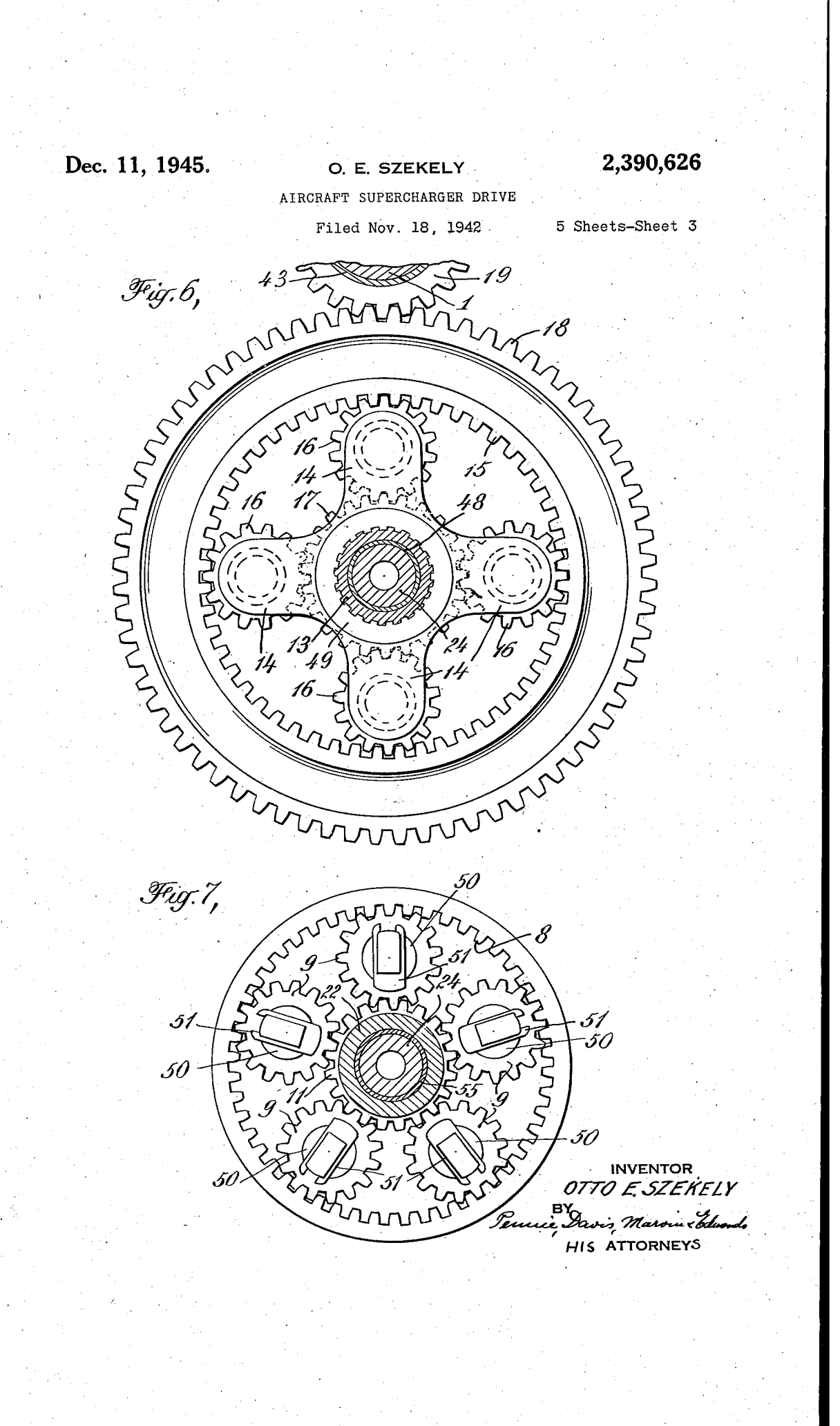

Fig. 6 is a transverse section taken on the plane indicated by line 6—6 of Fig. 5 illustrating parts of an epicyclic gear mechanism forming part of the drive;

Fig. 7 is a transverse section taken on line 7—7 of Fig. 5 illustrating parts of another epicyclic gear mechanism also forming part of the drive;

Fig. 8 is a transverse section taken on the line 8—8 of Fig. 5 illustrating the parts of a hydraulic resistance device which is driven by the epicyclic gear mechanism last referred to;

Fig. 9 is a transverse section taken on broken line 9—9 of Fig. 5 showing a similar hydraulic resistance device driven by the epicyclic gear mechanism first referred to;

Fig. 10 is a transverse section taken on broken line 10—10 of Fig. 5 to show the principal fluid connections to the two hydraulic resistance devices;

Fig. 11 is a transverse section taken on line 11—11 of Fig. 5, being a section through the control valve; and Fig. 12 is a similar view taken on line 12—12 of Fig. 5 to show the construction of a one-way roller clutch.

Figure 8:
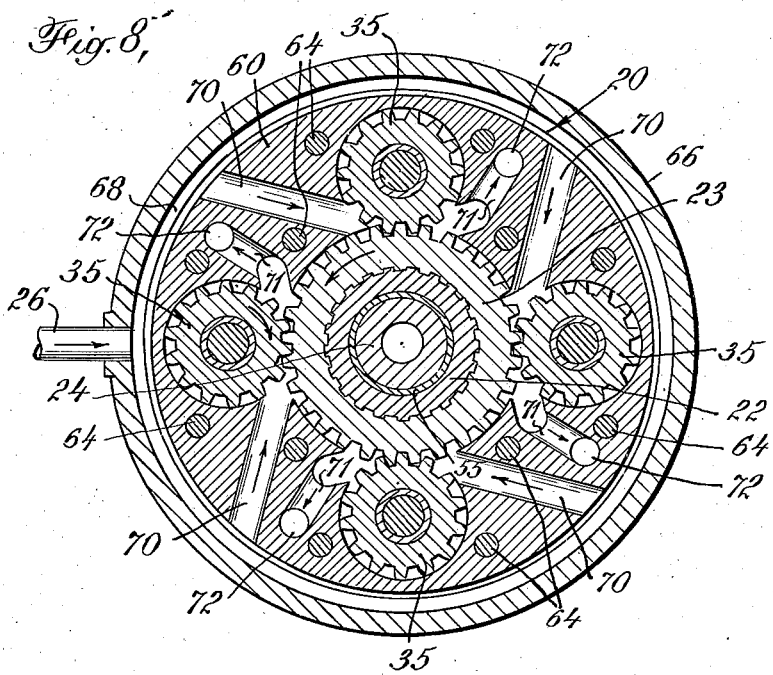

Referring now to these drawings, the invention will be first described in reference to the diagrammatic views, Figs. 1-4, inclusive, and then in connection with its details of construction as illustrated in Figs. 5-12, inclusive. The main shaft of an aircraft engine is indicated by numeral 1, and, rotating concentrically therewith is a sleeve shaft 2 on which is mounted the impeller 3 of a rotary air compressor or supercharger which constitutes the charging air pump for the engine. A large driving gear 4 is splined onto the right hand end of engine shaft 1 and meshes with the teeth of a pinion 5 which is keyed or otherwise secured on the reduced end of a hood-like member 6 of an epicyclic gear mechanism which is indicated generally by reference numeral 7 and which will be referred to as the primary epicyclic mechanism.

It will be understood that an epicyclic gear mechanism comprises three principal elements, namely, a power input element and two power output elements (sometimes referred to as the output element and the control element, or controlled element), these elements including gear wheels arranged to work together in such a way that when the input element is driven at a constant speed, the speeds of the two output elements are inversely proportional to one another; that is to say, if some appropriate means is provided for controlling the speed of one of the output elements, as its speed is reduced the speed of the other output element will be correspondingly increased, and vice versa. In the epicyclic mechanisms included in the supercharger drive of the present invention the two output elements of each mechanism will be referred to as the power output element and the speed control output element. Also each of these epicyclic, or planetary gear, mechanisms comprises an internal, or ring, gear and a sun gear, interconnected with one another by means of planet pinions which are mounted for rotation on sub shafts carried by a planet spider.

In epicyclic mechanism 7 the internal gear 8 is the power input element and its teeth are on the inside of hood-like member 6. They mesh with the teeth of a plurality of planet pinions 9 mounted on a spider 10. Planet pinions 9 also mesh with the teeth of sun gear 11.

A secondary epicyclic gear mechanism indicated generally by reference numeral 12 is arranged on the opposite side of pinion 5 and driving gear 4 and in generally coaxial relationship with the primary epicyclic mechanism 7. A sleeve shaft 13 joins these two mechanisms, the planet spider 10 of mechanism 7 being fixed to the right hand end of shaft 13 and planet spider 14 of secondary epicyclic mechanism 12 being fixed to its left hand end. Spider 10 is the power output element of epicyclic mechanism 7 and drives the input element of epicyclic mechanism 12 which consists of spider 14.

The power output element of secondary epicyclic mechanism 12 is the internal gear 15 which is rotated by planet spider 14 through planet pinions 16. It will be understood that these planet pinions are meshed both with the internal gear 15 and with sun gear 17 which constitutes the speed control output element or, more concisely, the control element of the secondary epicyclic mechanism. Internal gear 15 has formed integrally with it a larger spur gear 18, the teeth of which mesh with a driving pinion 19 which is fixed upon the right hand end of impeller shaft 2.

The two control elements, that is, the two output elements used for speed control, namely, sun gear 11 of the primary epicyclic mechanism 7 and sun gear 11 of the secondary epicyclic mechanism 12 are arranged to drive rotary fluid circulating, or hydraulic resistance, devices such as the gear type liquid pumps 20 and 21 respectively. Thus the sun gear 11 is connected through a sleeve shaft 22 to the power input gear 23 of gear pump 20 and sun gear 17 is connected by means of a shaft 24 with input gear 25 of gear pump 21. By controlling the flow of the fluid of these two pumps, increasing it, reducing it, or cutting it off entirely, the pumps are enabled to function as resistance devices for controlling the resistance to rotation (negative torque) appplied to the sun gears 11 and 17 respectively thereby regulating the speed of these gears and, consequently, the speed ratios between respective power input and power output elements of the two epicyclic mechanisms 7 and 12.

The two gear pumps 20 and 21 may be supplied with any suitable liquid, such as oil, through a common intake pipe 26 from any convenient reservoir, such as that indicated, for example, by reference numeral 27. The two pumps, however, have separate outlet pipes 28 and 29. These may, if desired, be supplied with pressure gauges 30 and 31 and are provided with flow control mechanism such, for example, as the valve 32 shown diagrammatically in Figs. 1-4. A return pipe 33 is provided from this valve to reservoir 27.

Valve 32 provides for the placing of both outlet pipes 28 and 29 in communication with return pipe 33 which is accomplished when the rotating member of plug 34 of the valve is placed in the position shown in Fig. 1. Under these conditions the liquid may be freely circulated through the pipe system described, and the pumps apply the minimum resistance to the speed control elements 11 and 17 of the epicyclic mechanisms. By turning valve member 34 somewhat to the left the flow from pipe 28 and pump 20 can be cut off either gradually or abruptly, but leaving the liquid circulating from pump 21 through pipes 29 and 33. Further turning of the valve member 34 to the left to the position shown in Fig. 3 results in either the abrupt or gradual cutting off of the flow from pump 21 as well as from pump 20. Finally by turning valve member 34 still further to the left the outlet pipe 29 of pump 21 can be placed in communication with the outlet pipe 28 of pump 20, pipe 33, however, remaining completely cut off.

Figure 9:
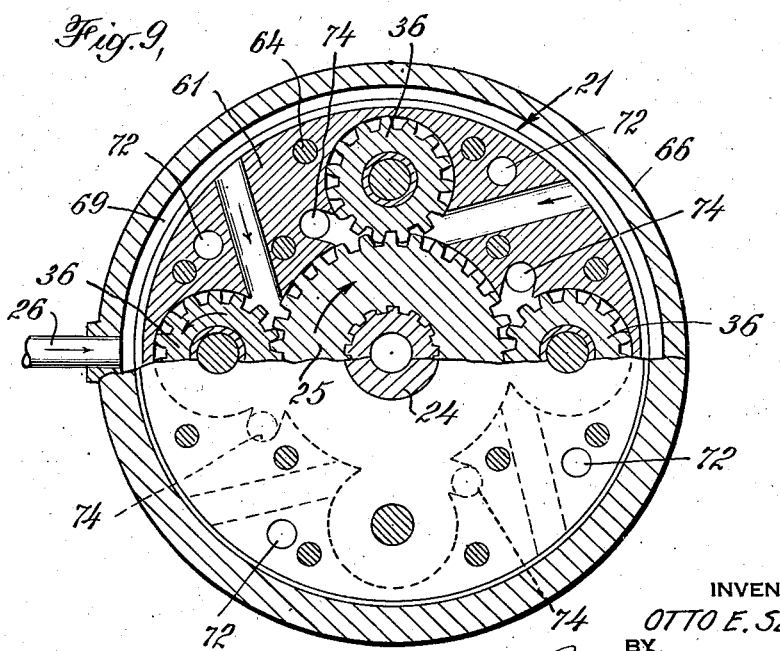

Gear pumps 20 and 21 have gears, the sides of which closely fit the walls of the pump casings so as to reduce pump leakage, and as indicated above, although the two pumps are located close together their liquid circuits are separate except when connected by means of valve 32. Each of the power input gears 23 and 25 coacts with a plurality of gears arranged around its periphery as illustrated in Figs. 8 and 9. Thus the teeth of input gear 23 mesh with the teeth of a series of gears 35 and the teeth of input gear 25 mesh with the teeth of a series of gears 36. Thus each pump is the equivalent of four gear pumps connected in parallel as will be described later.

In operation, the turning of the engine shaft 1 in the clockwise direction, for example, looking from the right in Fig. 1 causes pinion 5 and internal gear 8 to rotate in the opposite or counterclockwise direction. Accordingly internal gear 8 also rotates in the counterclockwise direction, and its teeth meshing with planet pinions 9 tend to rotate these pinions in the same direction. The rotation of these pinions on their respective stub shafts causes sun gear 11 to rotate, or tend to rotate, in the clockwise direction. Inasmuch as an epicyclic gear is a torque balancing device the two output elements of epicyclic gear 7, namely, sleeve shaft 13 of spider 10 and sleeve shaft 22 of sun gear 11 will both tend to rotate. The direction of rotation of shaft 13 is counterclockwise and that of shaft 22 is clockwise.

The speeds at which these shafts rotate will depend upon the difference in the resistances to rotation, or negative torques, applied to the two shafts and on the sizes of the gears of the epicyclic mechanism, that is to say, on the number of teeth of internal gear 8 and the number of teeth of sun gear 11. If, however, the resistance to rotation applied to one of these shafts, speed control output shaft 22, for example, is increased the speed of power output shaft 13 will increase. This is what happens when valve 32 is moved to close off pipe 28, the outlet from pump 20. When pipe 28 is fully closed off (Fig. 2) so that the flow of liquid from pipe 28 to return pipe 33 is stopped, pump 20 is then said to be in hydraulically locked condition and, with only a light load on power output shaft 13, the pump gears and the speed control shaft 22 would be stationary. Shaft 22, however, is never actually stationary, but may rotate at, say, 50 R. P. M., on account of the always substantial impeller torque and the "slip" of pumps 20 and 21.

Let us now assume that movable member 34 of valve 32 is left in the position shown in Fig. 2, just mentioned, in which pipe 28 from pump 20 is closed off; also that engine shaft 1 is rotating at its maximum speed. Then the speed of power output shaft 13 of epicyclic gear 7 will have been raised to its maximum and with it that of spider 14 of the secondary epicyclic mechanism 12. The planet pinions 16 are carried around with spider 14 and tend to drive both internal gear 15 and sun gear 17 in the same direction, namely, counterclockwise. Again, however, epicyclic mechanism 12 also being a torque balancing device, if the torque applied to internal gear 15 by the impeller 3 is greater than the resistance to rotation applied to sun gear 17 through shaft 24 by pump 21, the rotative speed of internal gear 15 will drop behind the rotative speed of spider 14 so that planet pinions 16 will commence to rotate on their stub shafts in the clockwise direction and this will cause sun gear 17 to rotate in the counterclockwise direction that is, in the same direction as that of internal gear 15.

Since valve member 34 is in the position of Fig. 2 the fluid of pump 21 can circulate freely through pipes 29, 33, reservoir 27, intake pipe 26 so that very little resistance to rotation is applied by pump 21 to sun gear 17 and these parts tend to rotate at high speed. However, a unidirectional roller clutch 37 (Fig. 12) is provided between the hub 38 of internal gear 15 and the base of an extension 39 of shaft 24 on the left hand side of sun gear 17. Hence when the rotative speed of shaft 24 reaches that of internal gear 15, the roller clutch 37 interconnects these two output elements of epicyclic mechanism 12, namely, sun gear 17 and internal gear 15. This renders the secondary epicyclic mechanism 12 inoperative as an epicyclic gear and compels internal gear 15 to rotate at the same speed as the shaft 13 of spider 10.

Therefore under these conditions, that is to say, with hydraulic resistance device or pump 20 hydraulically locked by placing the valve member 34 in the position shown in Fig. 2, the speed ratio between engine shaft 1 and impeller shaft 2 is substantially fixed and this ratio is determined by the relative sizes of step-up gearing 4, 5 and 18, 19 together with the gear ratio of primary epicyclic mechanism 7. This is an intermediate fixed ratio for the drive as a whole and the maximum ratio using epicyclic mechanism 7 only. In practice such over-all speed ratio with only primary epicyclic mechanism 7 locked may be, for example 7:1, but some other ratio could be chosen if desired.

It will be understood that any speed ratio from in the neighborhood of 1:1 up to this fixed intermediate ratio can be obtained by the gradual closing of the outlet pipe 28 of pump 20 by the gradual movement of valve member 34 from the position shown in Fig. 1 to that shown in Fig. 2. This intermediate fixed speed ratio just described is not intended to operate the supercharger impeller 3 at sufficiently high speed with respect to that of the engine to furnish the required amount of air to the engine at the higher altitudes at which it is desired to fly the plane. It does, however, provide an intermediate fixed speed ratio, with substantially no power loss in the speed control resistance device 20, which can be used when cruising for long periods of time at moderate altitudes, say, for example, from sea level up to five or ten thousand feet, depending upon the design of the engine and supercharger.

In order to increase the speed ratio between impeller shaft 2 and engine shaft 1 so as to supply the air requirements for flying at the higher altitudes, the secondary epicyclic mechanism 12 is provided, and this mechanism is brought into action by the turning of valve member 34 from the position shown in Fig. 2 to that shown in Fig. 3 or 5 where both outlet pipes 28 and 29 are completely cut off and both hydraulic pumps 20 and 21 are placed in hydraulically locked condition.

Assuming that valve 34 is moved gradually from the position of Fig. 2 to that of Fig. 3, the flow of fluid from pipe 29 of pump 21 will be gradually reduced. This gradually slows down the speed of shaft 24 with respect to that of internal gear 15 as it will be remembered that these were both operating at the same speed on account of the engagement of roller clutch 37. As the speed of shaft 24 falls off, the speed control element of epicyclic mechanism 12, namely, sun gear 17, is slowed and this, as will be understood from the description above, increases the speed of internal gear 15 and hence the speed of impeller shaft 2. This increase in speed ratio continues until valve member 34 has reached the closed position of Fig. 3, at which point shaft 24 driving pump 21, may be slowed to about 50 R. P. M. and the upper speed ratio of the improved supercharger drive has been reached. This ratio may, for example, be approximately 10:1, but, again a different ratio may be used, if desired.

By constructing the two epicyclic mechanisms 7 and 12 to have substantially equal but opposite speed ratios when locked, pumps 20 and 21 may be of the same size. Thus, the speed ratio of shaft 13 to pinion 5 may be .7 to 1 and that of internal gear 15 and shaft 13, 1.4 to 1, that is epicyclic mechanism 7 may be a speed reducer, and epicyclic mechanism 12 a speed multiplier. Although the two hydraulic resistance devices 20 and 21 are of the same size, the resistance necessary to bring sun gear 17 of secondary epicyclic mechanism 12 to locked condition is somewhat greater than in the case of sun gear 11 of the primary epicyclic 7. Consequently the fluid pressure in pipe 29 when both pumps are locked will be greater than that in pipe 28. Assuming that the pressure in pipe 29, when valve member 34 is in the closed position shown in Fig. 3, may be in the neighborhood of 250 pounds per square inch, yet in pipe 28 may be only two-thirds or three-quarters of the pressure in pipe 29. Therefore when valve member 34 is turned to the position shown in Fig. 4 so as to place these two pipes in communication with one another, the application of 150 pound pressure to pump 20 has the effect of bringing the rotation of sun gear 11 of epicyclic mechanism 7 closer to a standstill and this increases slightly the over-all speed ratio of the supercharger drive.

From the above description of the operation of the supercharger drive, it will be understood that, if desired, the speed of the supercharger impeller 3 can be increased with respect to the engine speed as the altitude of the airplane increases, by manual regulation of movable element 34 of valve 32, gradually closing off first the flow from pump 20 and thereafter the flow from pump 21. Automatic control of the speed ratio is obtained by closing off the flow from both pumps 20 and 21 before the plane leaves the ground. That is to say, the pilot, before taking off, places member 34 in the position shown in either Fig. 3 or Fig. 4. This immediately places both of the pumps in hydraulically locked condition but the 10:1 speed ratio is not obtained because, under sea level conditions the load on impeller 3 is substantially higher than it is after the plane has reached a high altitude. Thus, for example, at sea level the required impeller torque might be, for example, 35 foot-pounds, whereas at 20,000 feet this might be reduced to in the neighborhood of 28 foot-pounds and at 40,000 feet still further reduced to in the neighborhood of 23 foot-pounds. In the improved supercharger drive, the slip of each of pumps 20 and 21 under hydraulically locked condition varies directly with this change in impeller torque, and when operating with the higher impeller torque values such as exist when the airplane is operating at or near sea level, the amount of slip of the two pumps may be so arranged as to cause the over-all speed ratio between the impeller shaft and the engine shaft to be in the neighborhood of about 4:1 thereby causing the impeller to operate at about 8,000 R. P. M. As the altitude of the airplane increases and the impeller torque falls off, the slip of pumps 20 and 21 also falls off and the rotation of sun gears 11 and 17 is thereby reduced and the over-all speed ratio may be increased so that, for example, at an altitude of 3,000 feet the impeller speed may have risen to in the neighborhood of 16,000 R. P. M. or corresponding to a speed ratio of 8:1, and at 15,000 feet the impeller speed may have reached 20,000 R. P. M. corresponding to a speed ratio of 10:1. At about this point the maximum ratio may have been reached, the two gear pumps 20 and 21 turning very slowly or operating under as near stand-still conditions as possible. There is no further change in the speed ratio up to the ceiling of the airplane which depends, among other things, upon the power delivered by the engine at the higher altitudes with the supercharger operating at the 10:1 speed ratio.

Should the airplane now return to sea level, the consequent increase in the impeller torque automatically reduces the speed ratio through increase in the slip of the pumps 20 and 21, thereby causing the supercharger to operate at a slower speed and preventing air from being supplied to the engine cylinders at a pressure which might otherwise cause detonation and other undesirable effects. The drive therefore provides a change in speed ratio which is completely automatic and requires no attention on the part of the pilot and no supplementary delicate mechanism to bring about such automatic operation.

Referring now more particularly to Figs. 5-12, inclusive, the improved supercharger drive is mounted on the rear end of the engine below the engine main shaft 1. As shown in Fig. 5 the large gear 4 is splined at 40 onto the enlarged front end of the main shaft. The impeller 3 operates in a suitable rotary compressor housing 41 and is splined as indicated at 42 onto sleeve shaft 2. A floating bearing bushing 43 is provided between main shaft 1 and sleeve shaft 2 opposite driving gear 18 and pinion 19, the teeth of this pinion being preferably formed integrally with shaft 2.

From a constructional standpoint shaft 24 which connects sun gear 17 of the secondary epicyclic mechanism 12 with the driving gear 25 of pump 21, forms the backbone of the entire supercharger transmission or drive. The right hand end of shaft 24 has a bearing in a bushing which is supported in the end casting member 44 of pump 21. At the other end of shaft 24 its extension 39 rotates in a floating bushing 45 which in turn is carried in the bore of the hub 38 of the combination internal gear 15 and driving gear 18. This hub 38 in turn rotates in a bearing bushing 46 which is mounted in a boss 47 formed on one of the engine frame members.

Shaft 13 for the two planet spiders 10 and 14 rotates on a floating bearing bushing 48 which is sleeved onto shaft 24 approximately midway between its two end bearings above described. Spider 10 comprises five radial arms formed integrally on the right hand end of shaft 13. Spider 14 comprises four radial arms as shown in Fig. 6 extending from a hub 49 and this hub is splined onto the left hand end of shaft 13. Each of the five arms forming spider 10 has a short stub shaft 50 extending from it parallel to shaft 24 on which planet pinions 9 rotate. These pinions are retained in position by "hairpin" retainers 51 (Fig. 7) fitted into radial slots cut in the outer end of each stub shaft 50.

The pinions 16 of the secondary epicyclic mechanism 12 rotate on stub shafts 52 formed integrally with the radial arms forming spider 14 but shafts 52 do not project to the left beyond the pinion bores since the pinions are retained in place by the web surface of internal gear 15.

The hood-like member 6 which carries at its larger end the teeth of internal gear 8 of the primary epicyclic mechanism 7 is a solid bell-like or hood-shaped member partially enclosing the spider 10 and pinions 9 of this epicyclic mechanism. Its left hand end is reduced in diameter to form a short cylindrical portion having the teeth of pinion 5 cut into its outer surface and having a central bore constituting a bearing 53 on a bearing bushing 54 which is sleeved onto the exterior cylindrical surface of sleeve shaft 13. This is the bearing not only for driving pinion 5 but also for the entire member 6 and internal gear 8 of the epicyclic mechanism.

It is to be noted that the arrangement of the two epicyclic mechanisms 7 and 12 is such that all of these coaxial shafts having bearings one upon another rotate in the same direction. That is to say, driving pinion 5 with its integral member 6, sleeve shaft 13 carrying the spiders 10 and 14 and the interior shaft 24 by which sun gear 17 is drivingly connected to hydraulic pump 21, all rotate in the counterclockwise direction, but at differing speeds. This tends to reduce bearing speeds and consequently the lubrication problem and wear.

The sun gear 11 of primary epicyclic mechanism 7 is formed integrally with the sleeve shaft 22 by which this gear drives the input gear 23 of the first hydraulic resistance device or pump 20. Gear 23 is splined onto the right hand end of sleeve shaft 22 as shown in Fig. 8. A floating bearing bushing 55 separates shafts 22 and 24. Shaft 22 rotates in the clockwise direction and therefore in the opposite direction to shaft 24, but under load conditions these shafts rotate at only a few revolutions per minute so that no lubrication or wear problems are presented.

As shown in Figs. 9 and 5, the right hand end of shaft 24 is splined to receive the input gear 25 of gear pump 21 which controls the speed ratio of secondary epicyclic mechanism 12. The outer end of shaft 24 beyond gear 25 is reduced in diameter slightly to form the right hand main bearing for this shaft as previously referred to.

The series of rollers shown in Figs. 12 and 5 constituting the roller clutch 37 are separated by spacers 56 which consist of U-shaped pins which are positioned in radial holes at the base of extension 39 of shaft 24. These pins are held in position by means of a friction plug 57 which is threaded interiorly as shown in Fig. 5 to facilitate insertion and removal. Rollers 37 engage an internal cylindrical surface 58 within the hub of the double gear constituting internal gear 15 and spur gear 18. The rollers are wedged between this cylindrical surface and a series of cam surfaces 59 whenever the speed of shaft 24 tends to exceed that of the double gear 15—18.

The two pumps 20 and 21 are illustrated in cross section in Figs. 8 and 9 and comprise two pump chamber members 60 and 61 respectively of similar construction and comprising circular metal discs having a thickness equal to the width of the pump gears 35 and 36, respectively. These members 60 and 61 each have a generally circular central chamber which receives the pump driving gears 23 and 25, respectively, and opening out of these central chambers in approximately tangential relation thereto are four smaller circular chambers in which the gears 35 of pump 20 rotate and the gears 36 of pump 21. These chamber members 60 and 61 also have appropriately drilled holes constituting passages for the circulation of the fluid to and from the pump and for accommodating bolts which clamp the several pump elements together.

Pump chamber member 61 is positioned against a flat circular end plate forming a part of casting member 44. A thin circular plate 62 separates the two chamber members 61 and 60 and an end plate 63 closes the pump chambers on the inner face of member 60. These parts are all firmly clamped together by numerous screws 64 distributed over the surface of end plate 63, 12 such screws being employed in the pump illustrated. The contacting faces of these several parts are machined sufficiently smooth to prevent leakage when clamped together. Suitable clearance, however, is provided between the sides of the pump gears and their coacting walls to permit the free rotation of the gears. Also provision is made for the amount of slip required to provide the desired change in speed of the speed control elements of the two epicyclic gear mechanisms 7 and 12 respectively, namely, sun gears 11 and 17, with change in the impeller torque in going from sea level to the maximum desired altitude.

All parts of the supercharger drive, not only the two pumps just described, but also the epicyclic gear mechanisms 7 and 12, are assembled in a complete unitary structure comprising supporting members 65 and 66. These two members are secured together by bolts not shown during the assembling of the supercharger drive and the whole unitary drive structure including members 65 and 66 is removably secured in position on the frame of the engine by suitable bolts, one of which is indicated at 67. In removing this unitary drive structure from the engine, the teeth of driving gear 18 are released from pinion 19 and those of pinion 5 from driving gear 4.

The fluid passages to and from the two pumps 20 and 21 to the control valve 32 are shown in Figs. 5, 8, 9, 10 and 11. The inlet conduits 26 for the pumps 20 and 21 are shown in Figs. 8 and 9 and communicate with annular groove-like passageways 68 and 69, respectively. Passageway 68 surrounds the peripheral edge of chamber member 60 of pump 20 and annular passageway 69 is similarly placed in respect to pump 21.

The liquid flows inwardly from annular passageway 68 through four inwardly directed drilled openings 70 to the intake sides of the four pumping points. The liquid carried around in the spaces between the gear teeth is delivered through a second series of drilled passages 71, flowing in the direction of the arrows. Passages 71 communicate with four transverse passages 72 which are drilled through both pump chamber members 60 and 61 and separating plate 62 and into communication with a circular groove 73 in the outside surface of the outer end plate flange of casting member 44. The outside surface of this flange makes a ground fit with the flat inside surface of member 66 and the two surfaces are held in fluid tight relation to one another by means of suitable bolts.

Pump 21 is like pump 20, the fluid being delivered following the direction of the arrows from annular channel 69 through the inwardly directed drilled openings to the pumping points of the four gears. The fluid then flows through a second series of four passages 74 somewhat similar to transverse passages 72 but located on a circle of smaller diameter. These passages 74 communicate with a second annular groove 76 similar to groove 73.

The movable member 34 of valve 32 is constructed as a cup shaped member as shown in Fig. 5 which is received within an annular channel formed in the hub of casting member 44 and surrounds the outside end of shaft 24. Valve member 34 coacts with three ports 75, 76, 77 (Fig. 11) to produce the connections described above and shown diagrammatically in Figs. 1-4, inclusive. A radial passageway 28a in member 66 corresponds to conduit 28 of Figs. 1-4 and connects port 75 with the annular groove 73 which constitutes the outlet from pump 20. Passage 29a (Fig. 11) connects annular groove 76, the outlet from pump 21, with port 76. The discharge port 77 is connected by a third radial passageway shown in Fig. 11 with return conduit 33. Valve member 34 is suitably mounted for oscillation and actuation by means of a lever 78 and an actuating rod 79 which extend to a convenient location to be operated by the pilot.

By means of the present improved supercharger drive fully automatic change in speed ratio between the supercharger impeller and the engine main shaft to compensate for change in altitude has been provided. This driving mechanism, moreover, is simpler, more compact and lighter in weight than the turbo drive. It is as compact and light in weight as the change-gear drive. In fact the supercharger drive described above was arranged to fit into the exact space from which a change gear drive mechanism had been removed.

The improved drive eliminates such excessive wear in ordinary operation as necessarily takes place in the change gear form of drive and avoids the necessity of frequent replacement of parts such as the friction clutches of such drives. The automatic variation of the slip of the hydraulic resistance devices with change in engine torque, constitutes a yieldable drive between the engine and the supercharger impeller which prevents the transmission of torsional vibration from the engine shaft to the impeller.

It is to be understood that the foregoing is merely an exemplifying disclosure of the supercharger drive or transmission mechanism of the present invention, and that changes may be made without departing from the spirit of the invention, the scope of the invention being set forth in the appended claims.

I claim:

1. In a supercharger drive for internal combustion engines, primary and secondary epicyclic gear mechanisms, the primary mechanism having an input element driven by the engine, an output element and a control element, the secondary mechanism having output and control elements, the output element being connected to drive the supercharger impeller, and an input element driven by the output element of the primary mechanism, the control element of each epicyclic mechanism being connected to drive a rotary hydraulic resistance device having a predetermined slip when hydraulically locked, and means for effecting hydraulic lock thereof.

2. In a supercharger drive for internal combustion engines, primary and secondary epicyclic gear mechanisms, the primary mechanism having an input element driven by the engine, an output element and a control element, the secondary mechanism having an input element driven by the output element of the primary mechanism and output and control elements, the output element being connected to drive the supercharger impeller and the control element being connected to drive a rotary hydraulic resistance device having a predetermined slip when hydraulically locked, a second rotary hydraulic resistance device driven by the control element of the primary mechanism, and means for effecting hydraulic lock of one of said hydraulic resistance devices independently of the other.

3. In a supercharger drive for internal combustion engines, primary and secondary epicyclic gear mechanisms, the primary mechanism having an input element driven by the engine, an output element and a control element, the secondary mechanism having an input element driven by the output element of the primary mechanism and output and control elements, the output element being connected to drive the supercharger impeller and the control element being connected to drive a rotary hydraulic resistance device having a predetermined slip when hydraulically locked, a rotary hydraulic resistance device of similar type driven by the control element of the primary mechanism, means for effecting hydraulic lock of the resistance device driven by the primary mechanism only or of both resistance devices, and means for connecting together the output and control elements of the secondary mechanism when the resistance device driven by the primary mechanism is hydraulically locked.

4. In a supercharger drive for internal combustion engines, primary and secondary epicyclic gear mechanisms, the primary mechanism having an input element driven by the engine, the output element and a control element, the secondary mechanism having an input element driven by the output element of the primary mechanism and output and control elements, the output element being connected to drive the supercharger impeller and the control element being connected to drive a rotary hydraulic resistance device having a predetermined slip when hydraulically locked, a rotary hydraulic resistance device driven by the control element of the primary mechanism, means for effecting hydraulic lock of the resistance device driven by the primary mechanism only or of both resistance devices, and means for connecting together the output and control elements of the secondary mechanism to cause them to operate at the same speed when rotating above predetermined minimum speed.

5. In a supercharger drive for internal combustion engines, primary and secondary epicyclic gear mechanisms, the primary mechanism having an input element driven by the engine, an output element and a control element, the secondary mechanism having an input element driven by the output element of the primary mechanism and output and control elements, the output element being connected to drive the supercharger impeller and the control element being connected to drive a rotary hydraulic resistance device having a predetermined slip when hydraulically locked, a rotary hydraulic resistance device driven by the output element of the primary mechanism, means for effecting hydraulic lock of the resistance device driven by the primary epicyclic mechanism only or of both of said resistance devices, and means operative when the resistance device driven by the primary mechanism is hydraulically locked for connecting together the output and control elements of the secondary epicyclic mechanism to render said mechanism inoperative as an epicyclic gear.

6. In a supercharger drive for internal combustion engines, primary and secondary epicyclic gear mechanisms, the primary mechanism having an input element driven by the engine, an output element and a control element, the secondary mechanism having an input element driven by the output element of the primary mechanism and output and control elements, the output element being connected to drive the supercharger impeller and the input element being connected to drive a rotary liquid circulating device, a second rotary liquid circulating device driven by the output element of the primary mechanism, and flow control means for regulating the flow of the liquid of each liquid circulating device.

7. In a supercharger drive for internal combustion engines, primary and secondary epicyclic gear mechanisms, the primary mechanism having an input element driven by the engine, an output element and a control element, the secondary mechanism having an input element driven by the output element of the primary mechanism and output and control elements, the output element being connected to drive the supercharger impeller and the control element being connected to drive a rotary liquid circulating device, a rotary liquid circulating device driven by the control element of the primary mechanism and flow control means for selectively cutting off the flow of liquid of one or both of said liquid circulating devices.

8. In a supercharger drive for internal combustion engines, primary and secondary epicyclic gear mechanisms, the primary mechanism having an input element driven by the engine, an output element and a control element, the secondary mechanism having an input element driven by the output element of the primary mechanism and output and control elements, the output element being connected to drive the supercharger impeller and the control element being connected to drive a rotary liquid circulating device, a rotary liquid circulating device driven by the control element of the primary mechanism, and flow control means for selectively cutting off the flow of liquid of one of said devices or for cutting off the flow of liquid of both of said devices and simultaneously placing the outlets thereof in communication with one another.

9. In a supercharger drive for internal combustion engines, primary and secondary epicyclic gear mechanisms, the primary mechanism having an input element driven by the engine, an output element and a control element, the secondary mechanism having an input element driven by the output element of the primary mechanism and output and control elements, the output element being connected to drive the supercharger impeller and the control element being connected to drive a rotary liquid circulating device, a rotary liquid circulating device driven by the control element of the primary mechanism, flow control means for cutting off the flow of the liquid of said first device only or of both of said devices, and means for interconnecting the output and control elements of the secondary epicyclic gear mechanism when the flow is cut off from said first device only.

10. In a supercharger drive for internal combustion engines, primary and secondary epicyclic gear mechanisms, the primary mechanism having an input element driven by the engine, an output element and a control element, the secondary mechanism having an input element driven by the output element of the primary mechanism and output and control elements, the output element being connected to drive the supercharger impeller and the control element being connected to drive a rotary liquid circulating device, a rotary liquid circulating device driven by the control element of the primary mechanism, flow control means for cutting off the flow of the latter circulating device only or of both said devices, and means for interconnecting the output and control elements of the secondary epicyclic gear mechanism to prevent said control element from rotating at a higher speed than the output element which is connected to drive the impeller.

11. In a supercharger drive for internal combustion engines, primary and secondary epicyclic gear mechanisms, the primary mechanism having an input element driven by the engine, an output element and a control element, the secondary mechanism having an input element driven by the output element of the primary mechanism and output and control elements, the output element being connected to drive the supercharger impeller and the control element being connected to drive a rotary liquid circulating device, a rotary liquid circulating device driven by the control element of the primary mechanism, flow control means for cutting off the flow of the latter circulating device only or of both of said devices, and means to render the secondary epicyclic mechanism inoperative as an epicyclic gear when the flow of the circulating device driven by the primary mechanism is cut off.

12. In a supercharger drive for internal combustion engines, two epicyclic gear mechanisms having substantially equal and opposite gear ratios and each having an input element an output element and a control element, the output element of one epicyclic gear being connected to drive the input element of the second epicyclic gear, the input element of one epicyclic gear being driven by the engine and the output element of the second epicyclic gear being connected to drive the supercharger impeller, the control elements of both epicyclic gears being connected to drive separate liquid circulating devices, and flow control means for regulating and cutting off the flow of the liquid of each of said devices.

13. In a supercharger drive for internal combustion engines, two epicyclic gear sets, each having a ring gear, a spider carrying a planet pinion and a sun gear, the spider of one gear set being connected to drive the spider of the second gear set, the ring gear of one gear set being driven by the engine and the ring gear of the other gear set being connected to drive the supercharger impeller, and the sun gears of both gear sets being connected to drive independent liquid circulating devices, and flow control means for regulating and cutting off the flow of the liquid of each of said devices.

14. In a supercharger drive for internal combustion engines, primary and secondary epicyclic gear sets, the primary gear set having a ring gear driven by the engine, a sun gear and a spider carrying a planet pinion, the secondary gear set having a spider driven by the spider of the primary gear set, a sun gear and a ring gear, the ring gear being connected to drive the supercharger impeller and the sun gear to drive a rotary hydraulic pump, a rotary hydraulic pump driven by the sun gear of the primary gear set, and flow control means for regulating and cutting off the flow of the liquid of each of said pumps, and a unidirectional clutch interconnecting the sun and ring gears of the secondary gear set.

15. In apparatus of the class described, the combination of an internal combustion engine, a charging air pump connected to supply combustion air thereto, a power-transmitting mechanism comprising an epicyclic gear set having ring and sun gears and a spider carrying a planet pinion interconnecting said gears, the ring gear being operatively connected to the engine to be driven thereby and the spider being operatively connected to the charging air pump to drive the same, and a hydraulic pump driven by the sun gear and having a predetermined slip when hydraulically locked.

16. In apparatus of the class described, the combination of an internal combustion engine, a charging air pump connected to supply combustion air thereto, a power transmitting mechanism comprising an epicyclic gear set having ring and sun gears and a spider carrying a planet pinion interconnecting said gears, the spider being operatively connected to the engine to be driven thereby and the ring gear being operatively connected to the charging air pump to drive the same, and a hydraulic pump driven by the sun gear and having a predetermined slip when hydraulically locked.

17. In a supercharger drive for internal combustion engines having two epicyclic gear mechanisms and two gear pumps, the internal gear of one of said epicyclic mechanisms having a hollow hub journaled in a supporting frame, a main supporting shaft for the supercharger drive having one end journaled within said hollow hub and its opposite end journaled in said frame, the epicyclic mechanism with the aforementioned internal gear having its sun gear secured to said main shaft near one end thereof the driving gear of one of said pumps also being secured to said shaft near its opposite end, and, carried on said shaft between said sun gear and said driving gear, the remaining rotary elements of both epicyclic gear mechanisms and the driving gear of the second gear pump.

OTTO E. SZEKELY.